US012259615B2

(12) United States Patent
Hagihara et al.

(10) Patent No.: US 12,259,615 B2
(45) Date of Patent: Mar. 25, 2025

(54) BACKLIGHT APPARATUS AND LIQUID CRYSTAL DISPLAY APPARATUS

(71) Applicant: Sharp Display Technology Corporation, Kameyama (JP)

(72) Inventors: Satsuki Hagihara, Kameyama (JP); Kazuhiko Negoro, Kameyama (JP); Mayumi Hori, Kameyama (JP); Kenichi Iwamoto, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/658,856

(22) Filed: May 8, 2024

(65) Prior Publication Data

US 2024/0411178 A1    Dec. 12, 2024

Related U.S. Application Data

(60) Provisional application No. 63/471,947, filed on Jun. 8, 2023.

(51) Int. Cl.
*G02F 1/1335* (2006.01)
*G02F 1/13357* (2006.01)

(52) U.S. Cl.
CPC .. *G02F 1/133614* (2021.01); *G02F 1/133603* (2013.01); *G02F 1/133605* (2013.01); *G02F 1/133607* (2021.01)

(58) Field of Classification Search
CPC ......... G02F 1/133614; G02F 1/133603; G02F 1/133605; G02F 1/133607

USPC .......................................................... 349/66
See application file for complete search history.

(56) References Cited

U.S. PATENT DOCUMENTS

| 2020/0033527 | A1* | 1/2020 | Lee ................ G02F 1/133615 |
| 2020/0183234 | A1* | 6/2020 | Kim ................ G02F 1/133611 |
| 2021/0271135 | A1  | 9/2021 | Iwamoto et al. |

FOREIGN PATENT DOCUMENTS

WO    2019/244351 A1    12/2019

* cited by examiner

*Primary Examiner* — Charles S Chang
(74) *Attorney, Agent, or Firm* — ScienBiziP, P.C.

(57) ABSTRACT

A backlight apparatus includes an LED substrate having a principal surface over which a plurality of light-emitting elements that emit excitation light are arrayed, a phosphor layer containing a phosphor that emits fluorescence upon receiving the excitation light, a wavelength-selective reflecting layer disposed between the phosphor layer and the LED substrate, and a louver film disposed between the wavelength-selective reflecting layer and the LED substrate and having a plurality of louvers. The wavelength-selective reflecting layer has different transmittances according to wavelengths and/or angles of incidence of light falling thereon. The louver film blocks the fluorescence and the excitation light falling thereon at an angle greater than or equal to a first angle and smaller than 90 degrees with respect to a direction normal to a film surface of the louver film.

12 Claims, 12 Drawing Sheets

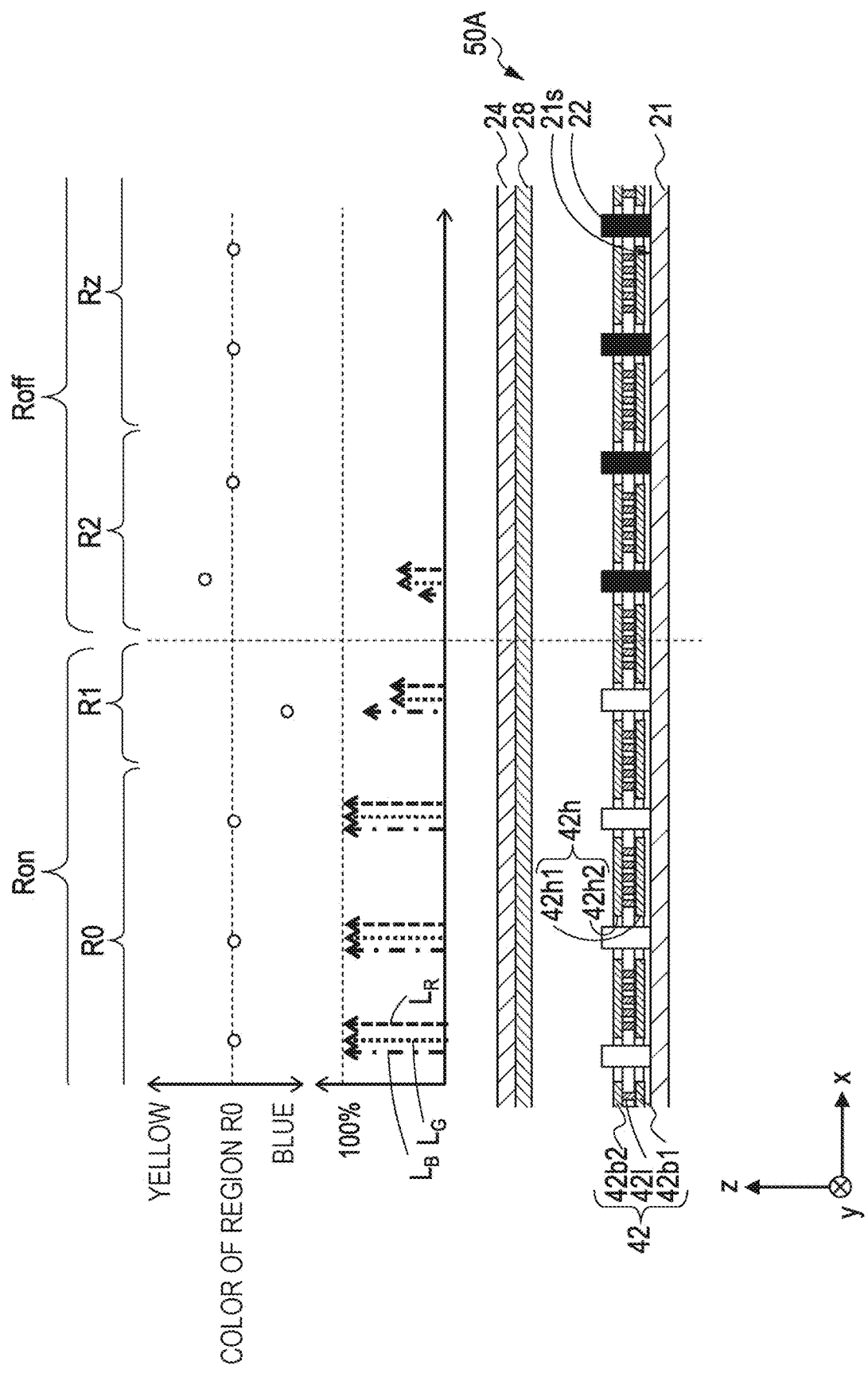

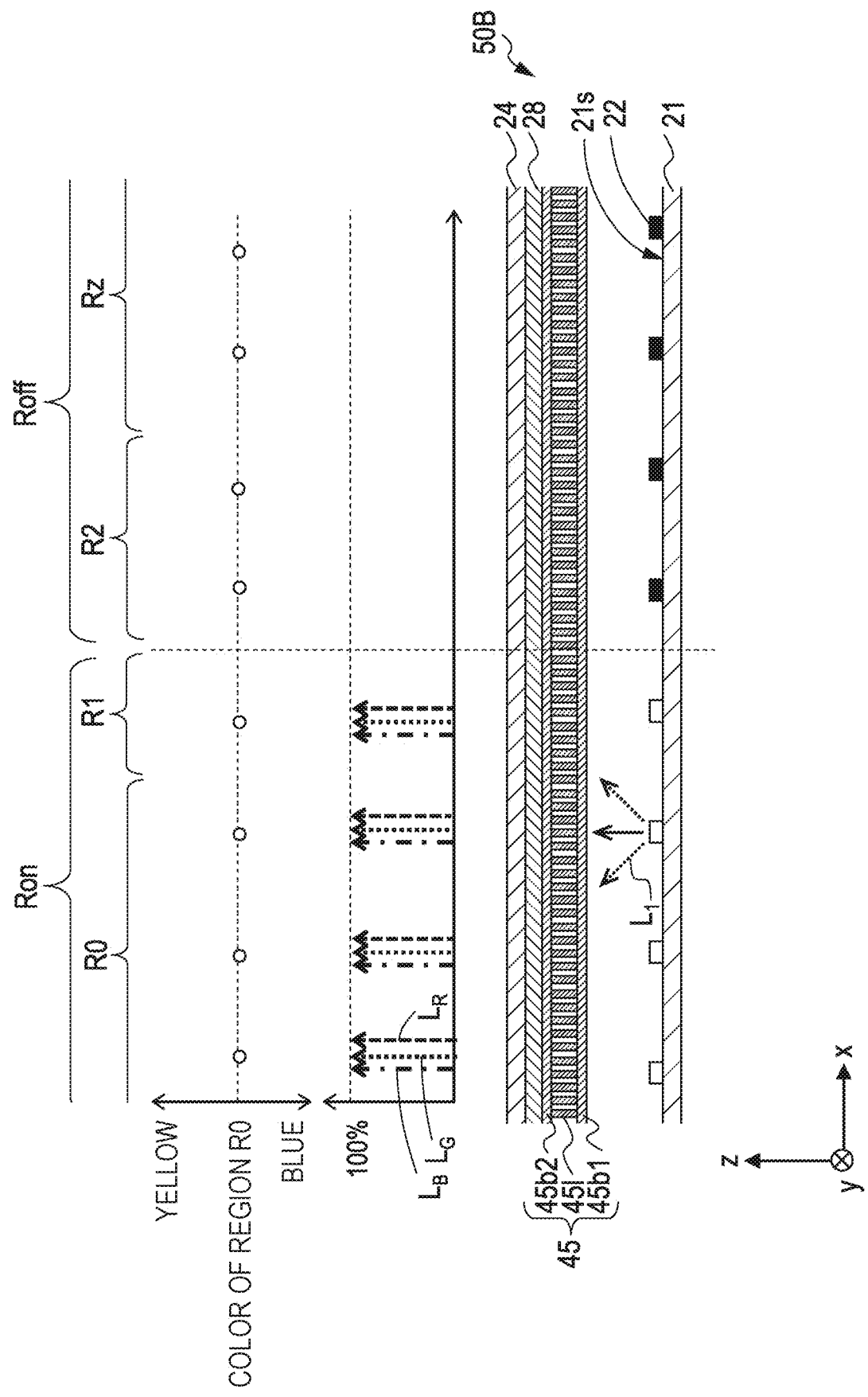

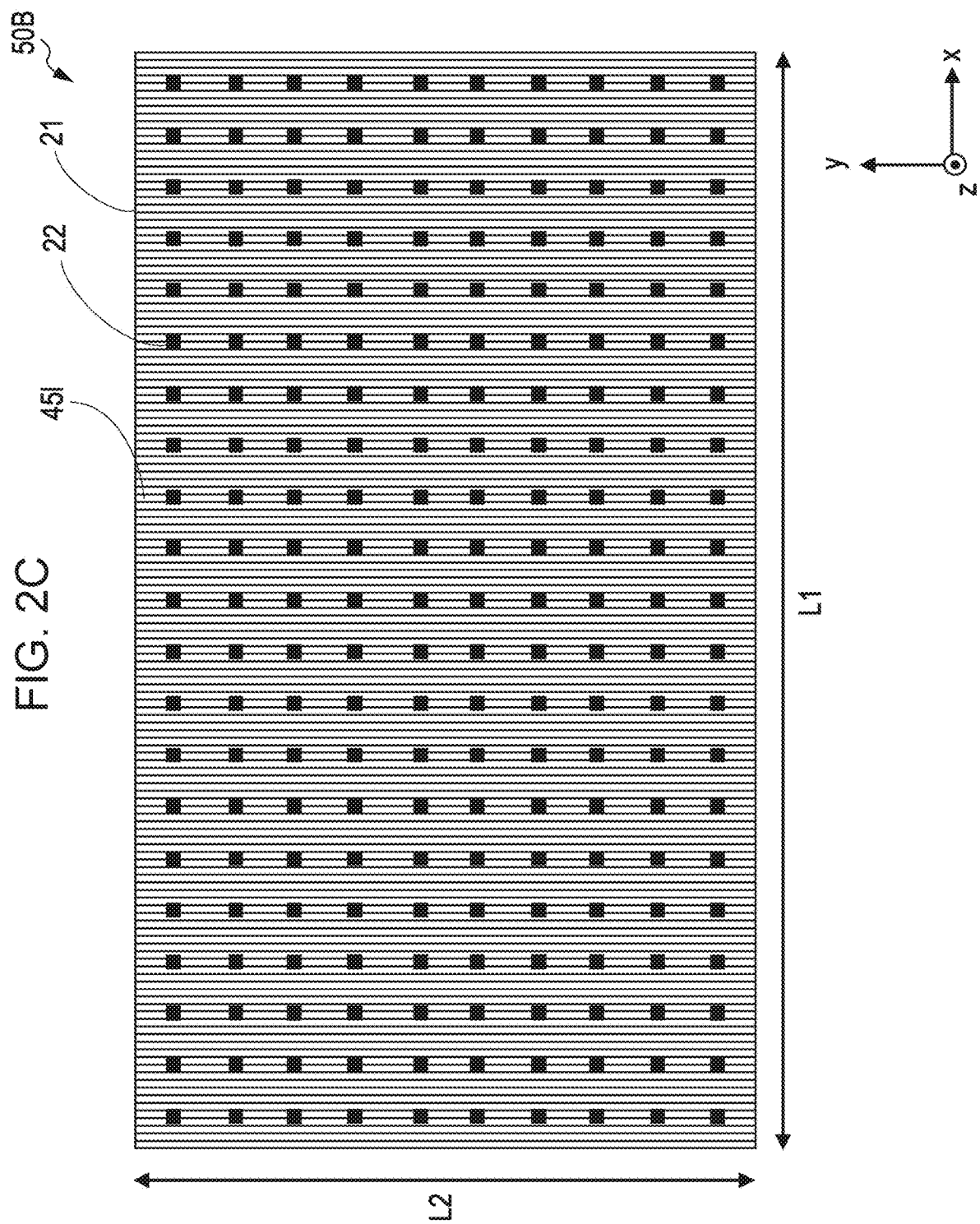

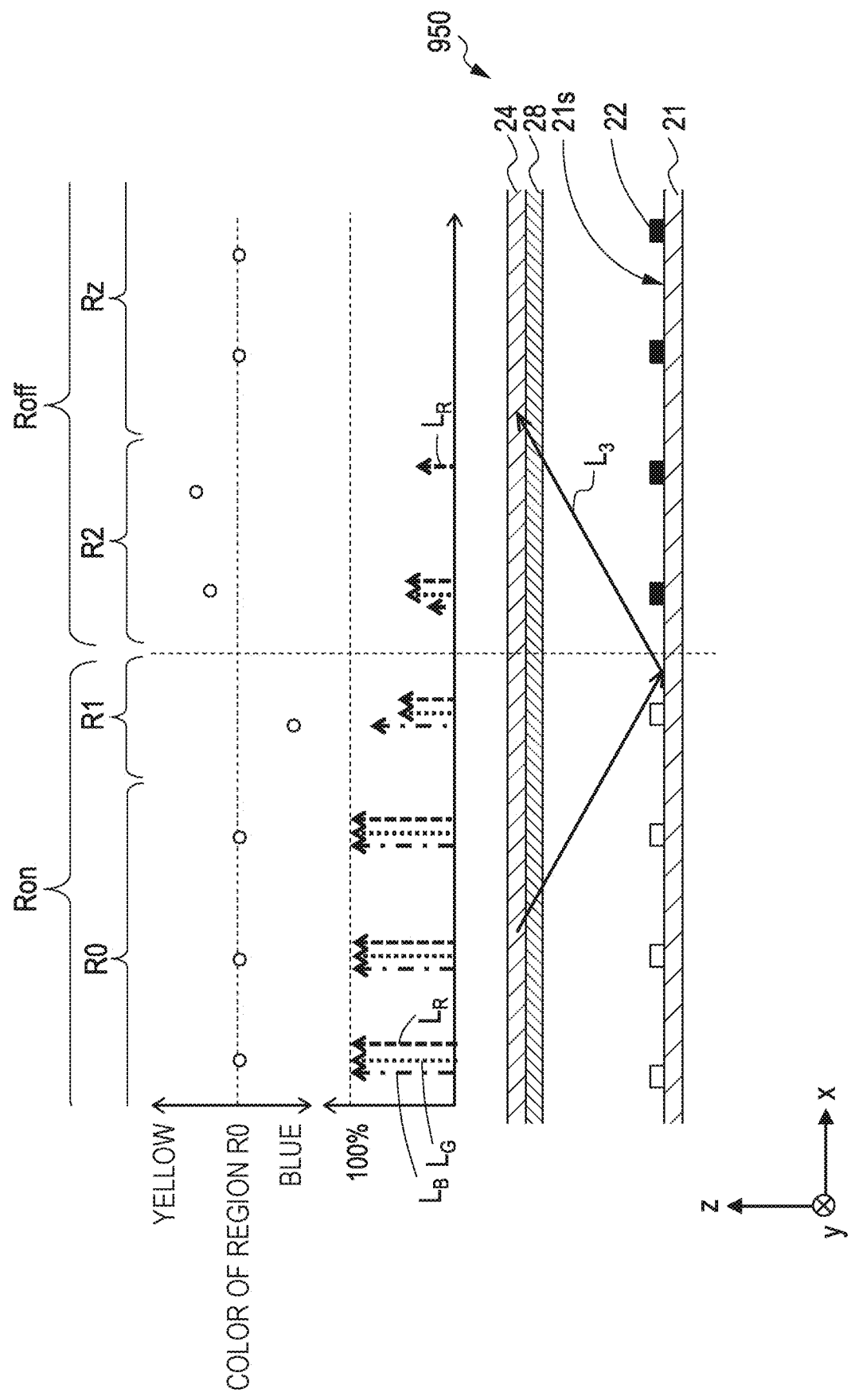

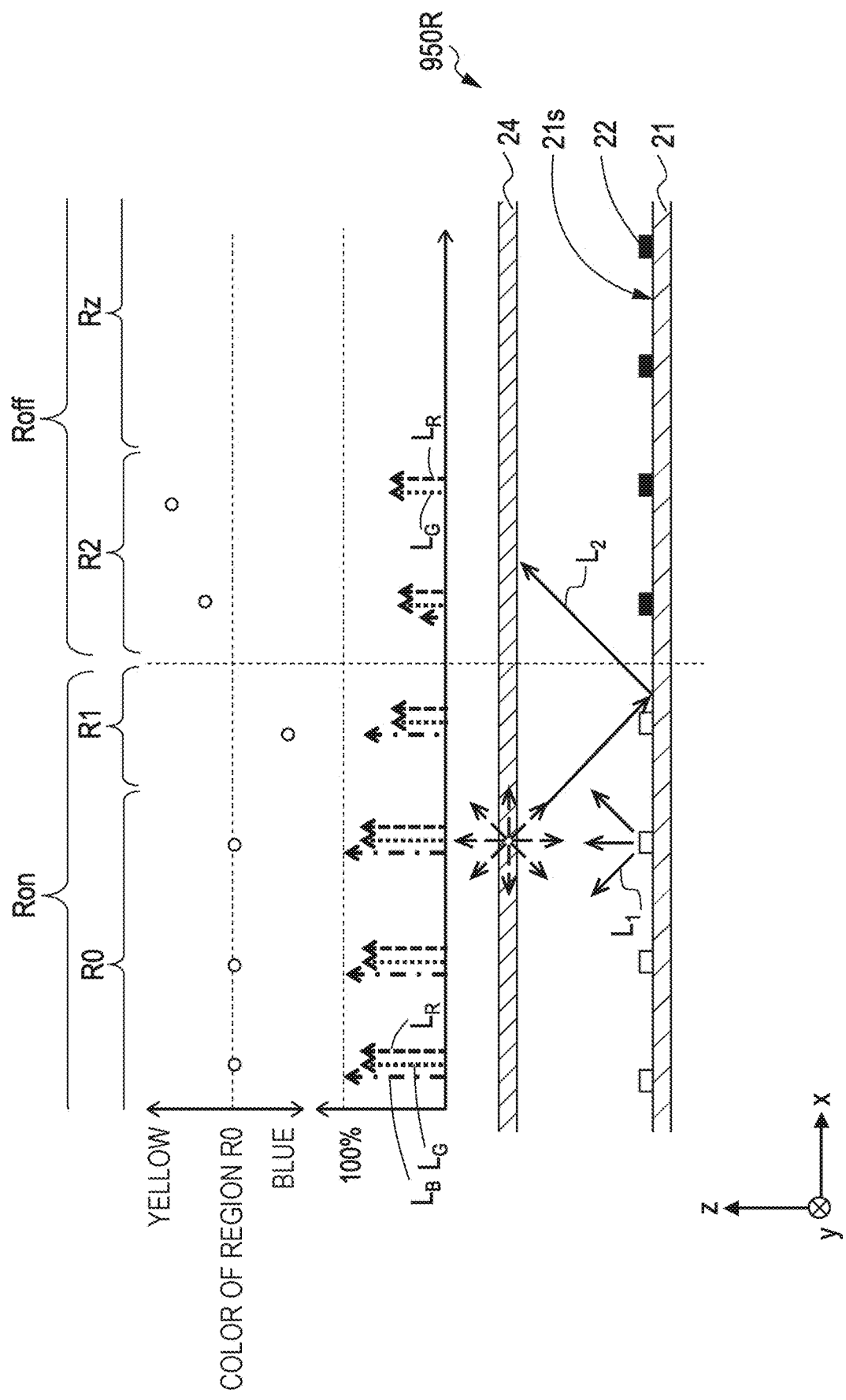

BACKLIGHT APPARATUS AND LIQUID CRYSTAL DISPLAY APPARATUS

BACKGROUND

1. Field

The present disclosure relates to a backlight apparatus and a liquid crystal display apparatus.

2. Description of the Related Art

Many liquid crystal display apparatuses include backlight apparatuses including a plurality of LEDs. The plurality of LEDs are for example divided into a plurality of regions, and only LEDs in a region that needs illuminating light are turned on or each region is adjusted to a desired luminance. Such a method of driving a backlight is called "divided driving", "partial driving", "area driving", or "local dimming". Employing the divided driving method makes it possible to improve the contrast ratio of luminance between a bright section and a dark section of a liquid crystal display apparatus.

In recent years, to improve the display quality of a display apparatus, a liquid crystal display apparatus that is compatible with High Dynamic Range (hereinafter referred to as "HDR") has been commercially available.

Furthermore, as described, for example, in International Publication No. 2019/244351, a liquid crystal display apparatus including a backlight apparatus that employs a remote phosphor system and that can suppress color unevenness with a dichroic filter has been studied as a liquid crystal display apparatus that is compatible with the UHD Premium standard (higher than or equal to 90% of the color reproducibility BT2020 standard; HDR10 standard).

According to the inventors' study, the liquid crystal display apparatus of International Publication No. 2019/244351 is undesirably unable to sufficiently reduce degradation in display quality due to the occurrence of color unevenness. Details will be described later.

It is desirable to provide a backlight apparatus that can reduce degradation in the display quality of a liquid crystal display apparatus and a liquid crystal display apparatus including such a backlight apparatus.

SUMMARY

According to an aspect of the disclosure, there is provided a backlight apparatus including an LED substrate having a principal surface over which a plurality of light-emitting elements that emit excitation light are arrayed, a phosphor layer containing a phosphor that emits fluorescence upon receiving the excitation light, a wavelength-selective reflecting layer disposed between the phosphor layer and the LED substrate, the wavelength-selective reflecting layer having different transmittances according to wavelengths and/or angles of incidence of light falling thereon, and a louver film disposed between the wavelength-selective reflecting layer and the LED substrate and having a plurality of louvers, the louver film blocking the fluorescence and the excitation light falling thereon at an angle greater than or equal to a first angle and smaller than 90 degrees with respect to a direction normal to a film surface of the louver film.

According to an aspect of the disclosure, there is provided a liquid crystal display apparatus including a liquid crystal display panel and the backlight apparatus. The backlight apparatus emits light toward a back surface of the liquid crystal display panel.

BRIEF DESCRIPTION OF THE DRAWINGS

FIG. 1C is a schematic cross-sectional view of the backlight apparatus being used to perform partial driving;

FIG. 2B is a schematic cross-sectional view of the backlight apparatus being used to perform partial driving;

FIG. 2C is a plan view of the backlight apparatus and is a diagram schematically showing an example of a positional relationship between louvers and light-emitting elements;

FIG. 3B is a schematic cross-sectional view of the backlight apparatus of Comparative Example 1 being used to perform partial driving;

FIG. 4A is a schematic cross-sectional view of a backlight apparatus of Comparative Example 2 being used to perform partial driving.

DESCRIPTION OF THE EMBODIMENTS

The following describes embodiments of the present disclosure with reference to the drawings. Note that the present disclosure is not limited to the following embodiments. Constituent elements having substantially the same functions are assigned common reference signs in the following drawings, and a description of such constituent elements may be omitted.

Embodiment 1

Figure 1A:
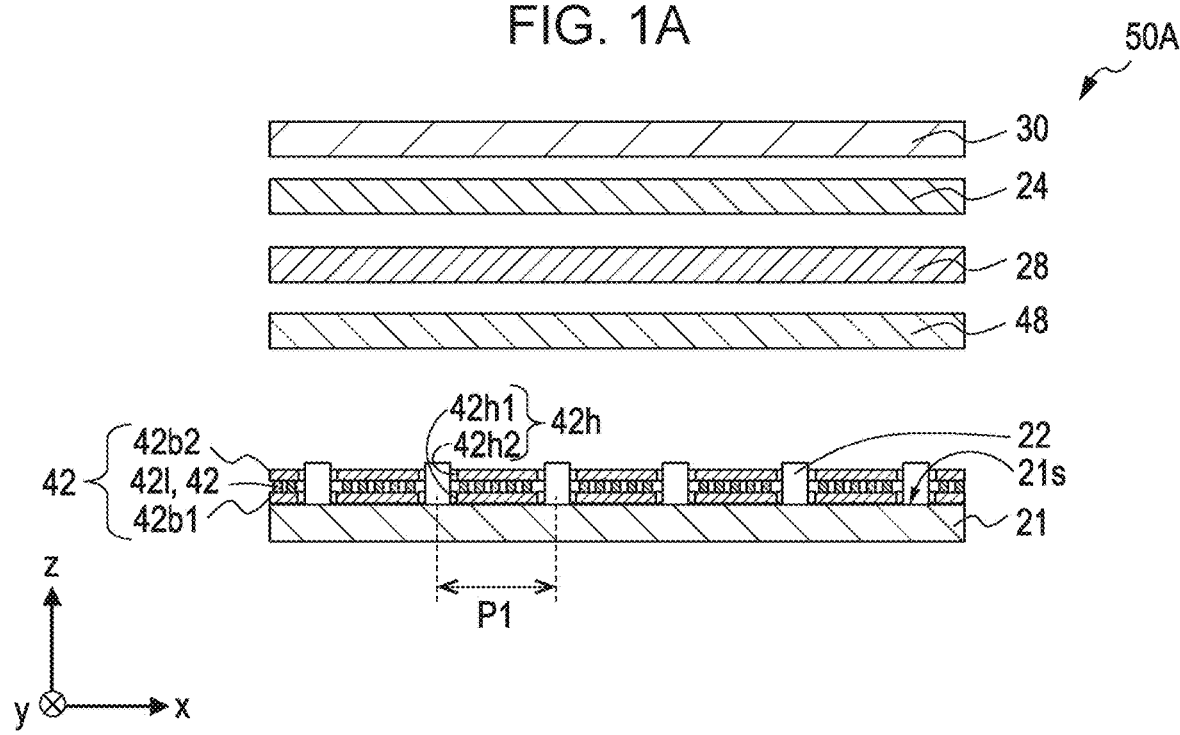
FIG. 1A is a cross-sectional view schematically showing a backlight apparatus according to Embodiment 1 of the present disclosure.
Figure 1B:
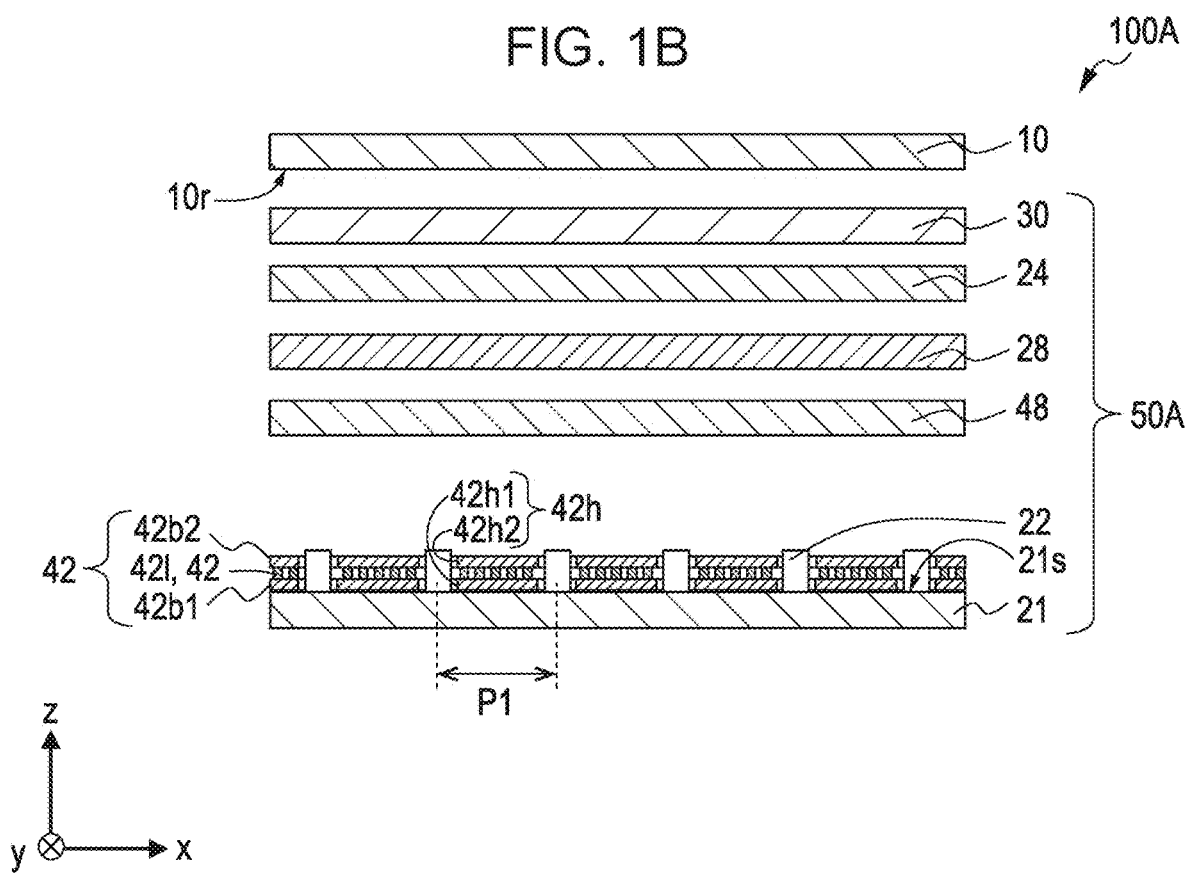
FIG. 1B is a cross-sectional view schematically showing a liquid crystal display apparatus including the backlight apparatus.
Figure 1D:
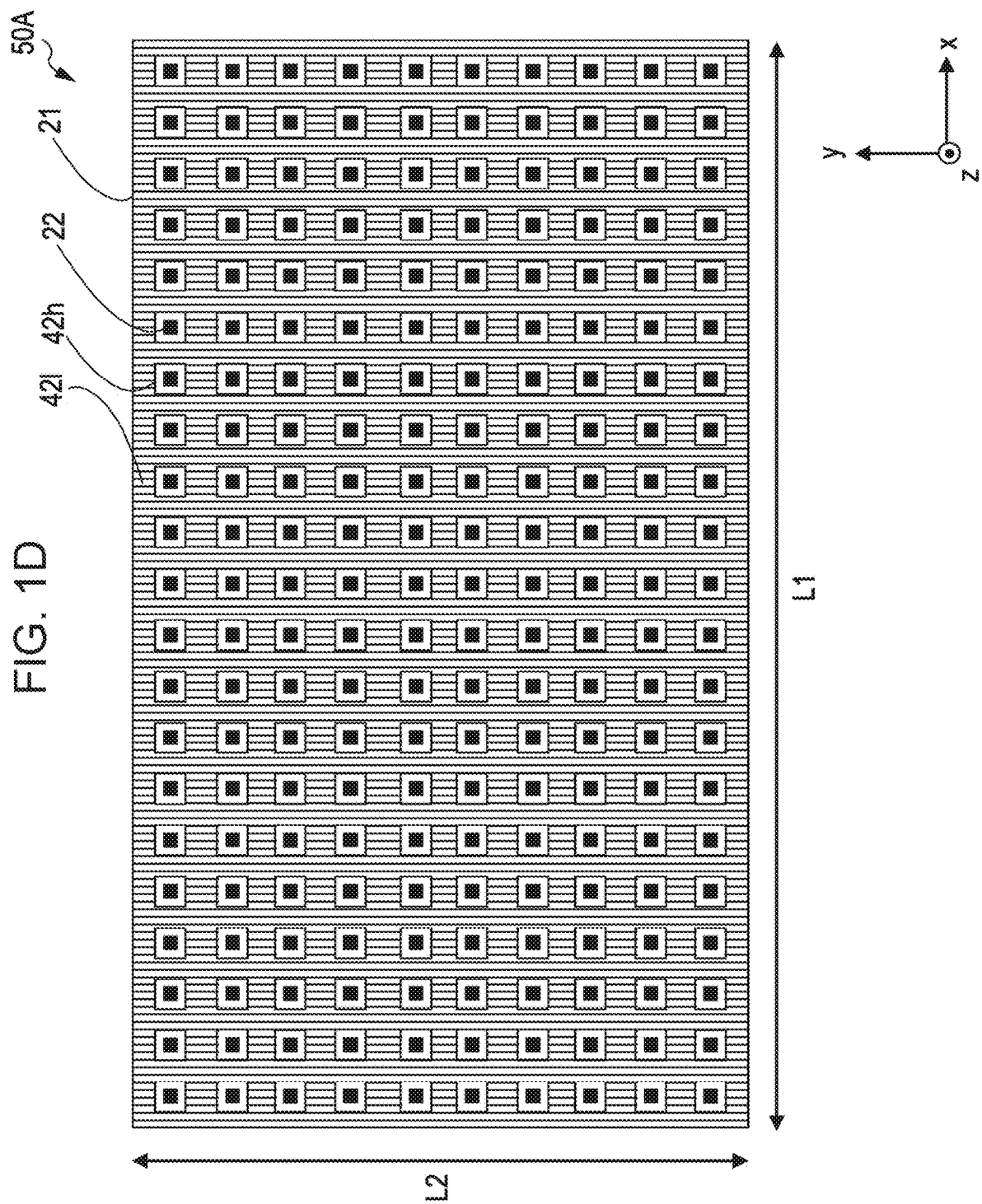
FIG. 1D is a plan view of the backlight apparatus and is a diagram schematically showing an example of a positional relationship between louvers and light-emitting elements.

A backlight apparatus 50A according to the present embodiment and a liquid crystal display apparatus 100A including the backlight apparatus 50A are described with reference to FIGS. 1A, 1B, 1C, and 1D. FIG. 1A is a cross-sectional view schematically showing a backlight apparatus 50A according to Embodiment 1, and FIG. 1B is a cross-sectional view schematically showing a liquid crystal display apparatus 100A including the backlight apparatus 50A. FIG. 1C is a schematic cross-sectional view of the backlight apparatus 50A being used to perform partial driving. FIG. 1D is a plan view of the backlight apparatus 50A and is a diagram schematically showing an example of a positional relationship between louvers 421 and light-emitting elements 22.

The backlight apparatus 50A includes an LED substrate 21 having a principal surface 21s over which a plurality of light-emitting elements 22 that emit excitation light are arrayed, a phosphor layer 24 containing a phosphor that emits fluorescence upon receiving the excitation light, a wavelength-selective reflecting layer 28 disposed between the phosphor layer 24 and the LED substrate 21, and a louver film 42 disposed between the wavelength-selective reflecting layer 28 and the LED substrate 21 and having a plurality of louvers 421. The wavelength-selective reflecting layer 28 having different transmittances according to wavelengths and/or angles of incidence of light falling the wavelength-selective reflecting layer 28. The louver film 42 blocks the fluorescence and the excitation light falling thereon at an angle greater than or equal to a first angle and smaller than 90 degrees with respect to a direction normal to a film surface of the louver film 42. In the illustrated example, the louver film 42 includes two opposed base films 42b1 and 42b2 and the plurality of louver 421 disposed between two base films 42b1 and 42b2 and each having a principal surface intersecting principal surfaces of the base films 42b1 and 42b2. The film surface of the louver film 42 is a flat surface parallel to the principal surface of the base film 42b1 or 42b2. The film surface of the louver film 42 (i.e. a flat surface parallel to the principal surface of the base film 42b1 or 42b2) is a flat surface parallel to an x-y plane in the illustrated example, and the direction normal to the film surface of the louver film 42 is a direction parallel to a z direction in the illustrated example. The plurality of louvers 421 are each in the shape of a plate having a principal surface parallel to a y-z plane in the illustrated example, and are placed substantially parallel to each other.

The clause "the louver film 42 blocks the fluorescence and the excitation light falling thereon at an angle greater than or equal to a first angle and smaller than 90 degrees with respect to a direction normal to a film surface of the louver film 42" means that the louver film 42 has a transmittance lower than or equal to 50% to the fluorescence and the excitation light falling on the louver film 42 at an angle greater than or equal to the first angle and smaller than 90 degrees with respect to the direction normal to the film surface of the louver film 42. The first angle is for example larger than or equal to 30 degrees, or may be larger than or equal to 15 degrees. For example, the plurality of louvers 421 of the louver film 42 have a function of blocking at least part of the fluorescence emitted by the phosphor layer 24 and the excitation light emitted by the light-emitting elements 22.

In the backlight apparatus 50A, the louver film 42 is supported by the LED substrate 21. That is, the louver film 42 is fixed to the LED substrate 21. The louver film 42 is provided over the principal surface 21s of the LED substrate 21. The louver film 42 may be in contact with the principal surface 21s of the LED substrate 21. The louver film 42 may be mounted on the principal surface 21s of the LED substrate 21, or may be pasted to the principal surface 21s of the LED substrate 21 via an adhesive layer. In the illustrated example, the louver film 42 has a plurality of openings 42h. In this example, each opening 42h has an opening 42h1 provided in the base film 42b1 and an opening 42h2 provided in the base film 42b2. Each of the plurality of openings 42h overlaps any of the plurality of light-emitting elements 22 when seen in a direction normal to the principal surface 21s of the LED substrate 21. The plurality of light-emitting elements 22 are exposed at the plurality of openings 42h.

As shown in FIGS. 1A and 1D, each of the plurality of louvers 421 is disposed between adjacent ones of the plurality of light-emitting elements 22 when seen in the direction normal to the principal surface 21s of the LED substrate 21. Each of the plurality of louvers 421 is disposed in such a position as not to overlap each of the plurality of light-emitting elements 22 when seen in the direction normal to the principal surface 21s of the LED substrate 21. The plurality of louvers 421 may include a louver 421 divided into a plurality of portions in a y direction so as not to overlap the light-emitting elements 22 when seen in the direction normal to the principal surface 21s of the LED substrate 21 and a louver 421 whose y-direction length is substantially equal to a y-direction length L2 of the LED substrate 21. Adjacent louvers 421 do not need to be all placed at the same distance from each other. In the backlight apparatus 50A, two or more louvers 421 are disposed between adjacent ones of the plurality of light-emitting elements 22. A usable example of a louver film of a backlight apparatus of the present embodiment is a security/privacy filter (commercially available as "PF430W9B") manufactured by 3M. The louver film 42 illustrated may be obtained by providing a plurality of openings in such a filter.

The backlight apparatus 50A further includes a diffuser 48 disposed between the louver film 42 and the wavelength-selective reflecting layer 28. For simplicity, FIG. 1C omits to illustrate the diffuser 48. The wavelength-selective reflecting layer 28 and the phosphor layer 24 may be supported by the diffuser 48. For example, a stack of the wavelength-selective reflecting layer 28 and the phosphor layer 24 stacked in this order may be placed over the diffuser 48, or these layers may be bonded to each other via an adhesive layer and then fixed to the diffuser 48. Note that the diffuser 48 may be omitted.

As shown in FIG. 1B, the liquid crystal display apparatus 100A includes a liquid crystal display panel 10 and the backlight apparatus 50A. In the liquid crystal display apparatus 100A, the backlight apparatus 50A emits light toward a back surface 10r of the liquid crystal display panel 10.

The backlight apparatus 50A is a remote-phosphor direct backlight. Under a remote phosphor system, the phosphor layer 24 is far away from the light-emitting elements 22, so that deterioration of the phosphor due to heat generated by the light-emitting elements 22 can be reduced.

The phosphor layer 24 contains a phosphor that emits fluorescence upon excitation by excitation light emitted by the light-emitting elements 22. For example, in a case where the light-emitting elements 22 are blue LEDs that emit blue light, the phosphor layer 24 may contain a green phosphor that emits green fluorescence and/or a red phosphor that emits red fluorescence, or may contain a yellow phosphor that emits yellow fluorescence. From the point of view of attaining high color rendering properties, it is preferable that the phosphor layer 24 contain a green phosphor that emits green fluorescence and a red phosphor that emits red fluorescence. The phosphor layer 24 may contain, for example, a quantum dot green phosphor that emits green fluorescence and/or a quantum dot red phosphor that emits red fluorescence. In general, the quantum dot phosphors have the advantages of being narrow in half-width of a peak wavelength of an emission spectrum and high in color purity and therefore satisfy, for example, the UHD Premium standard (higher than or equal to 90% of the color reproducibility BT2020 standard; HDR10 standard), so they are considered promising. Alternatively, publicly-known phosphors such as a red sulfide phosphor (e.g. a calcium sulfide phosphor) and a green sulfide phosphor (e.g. a thiogallate phosphor) may be used. A protective layer may be provided on both sides or one side of the phosphor layer 24.

In a case where the angle of incidence (angle with respect a direction normal to a film surface of the wavelength-selective reflecting layer 28) of light falling on the wavelength-selective reflecting layer 28 (e.g. a dichroic filter) is smaller than a predetermined angle (e.g. smaller than 40 degrees), the transmittance of the wavelength-selective reflecting layer 28 to the excitation light emitted by the plurality of light-emitting elements 22 is higher than the transmittance of the wavelength-selective reflecting layer 28 to the fluorescence emitted by the phosphor layer 24. That is, the transmittance of the wavelength-selective reflecting layer 28 to the excitation light falling on the wavelength-selective reflecting layer 28 at a second angle of incidence larger than or equal to 0 degree and smaller than 40 degrees is higher than the transmittance of the wavelength-selective reflecting layer 28 to the fluorescence falling on the wavelength-selective reflecting layer 28 at the second angle of incidence. Meanwhile, the transmittance of the wavelength-selective reflecting layer 28 to the excitation light falling on the wavelength-selective reflecting layer 28 at a third angle of incidence that is larger than the second angle of incidence is lower than the transmittance of the wavelength-selective reflecting layer 28 to the fluorescence falling on the wavelength-selective reflecting layer 28 at the third angle of incidence. The third angle is for example an angle larger than or equal to 70 degrees and smaller than 90 degrees. In response to light falling on the wavelength-selective reflecting layer 28 at the second angle of incidence, the wavelength-selective reflecting layer 28 transmits at least part of a wavelength region of the excitation light emitted by the plurality of light-emitting elements 22 and reflects at least part of the fluorescence emitted by the phosphor layer 24. It is preferable that in response to light falling on the wavelength-selective reflecting layer 28 at the second angle of incidence, the wavelength-selective reflecting layer 28 transmit all of a wavelength region of the excitation light emitted by the plurality of light-emitting elements 22 and reflect all of the fluorescence emitted by the phosphor layer 24. For example, in a case where the light-emitting elements 22 are blue LEDs, in response to light falling on the wavelength-selective reflecting layer 28 at the second angle of incidence, the wavelength-selective reflecting layer 28 transmits light of a emission wavelength region of the blue LEDs (i.e. blue light) and reflects light of a green to red wavelength region. In response to light falling on the wavelength-selective reflecting layer 28 at the third angle of incidence, the wavelength-selective reflecting layer 28 transmits at least part of the fluorescence emitted by the phosphor layer 24 and reflects at least part of a wavelength region of the excitation light emitted by the plurality of light-emitting elements 22. For example, in response to light falling on the wavelength-selective reflecting layer 28 at the third angle of incidence, the wavelength-selective reflecting layer 28 reflects blue light and transmits red light. Note that light emitted by the phosphor is herein sometimes called "fluorescence". Unless otherwise noted, the term "fluorescence" encompasses fluorescence and phosphorescence in a narrow sense. The wavelength-selective reflecting layer 28 is for example an optical multilayer film having a stack structure in which films of different refractive indices are stacked.

As will be described below, the backlight apparatus 50A can suppress color unevenness during partial driving by including the wavelength-selective reflecting layer 28.

Figure 3A:
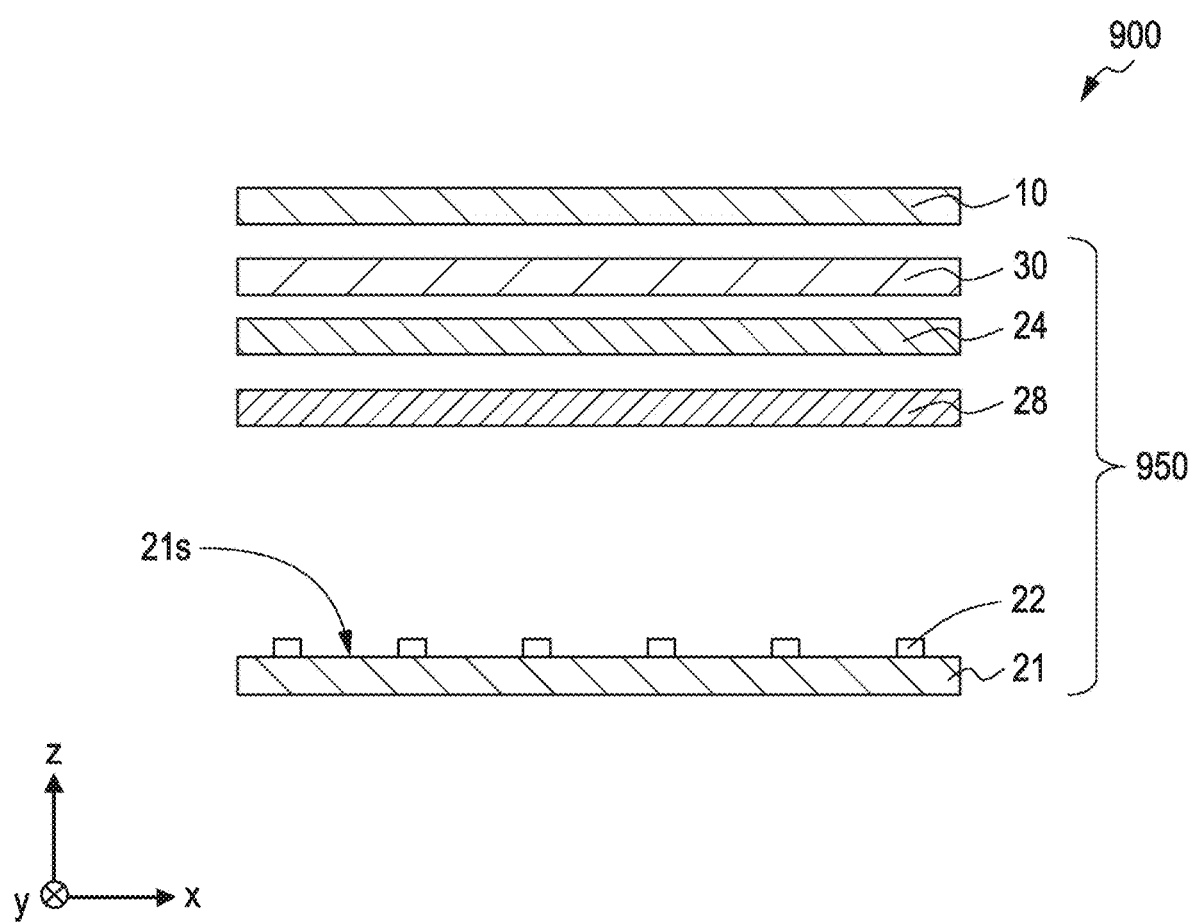
FIG. 3A is a cross-sectional view schematically showing a backlight apparatus of Comparative Example 1.
Figure 4B:
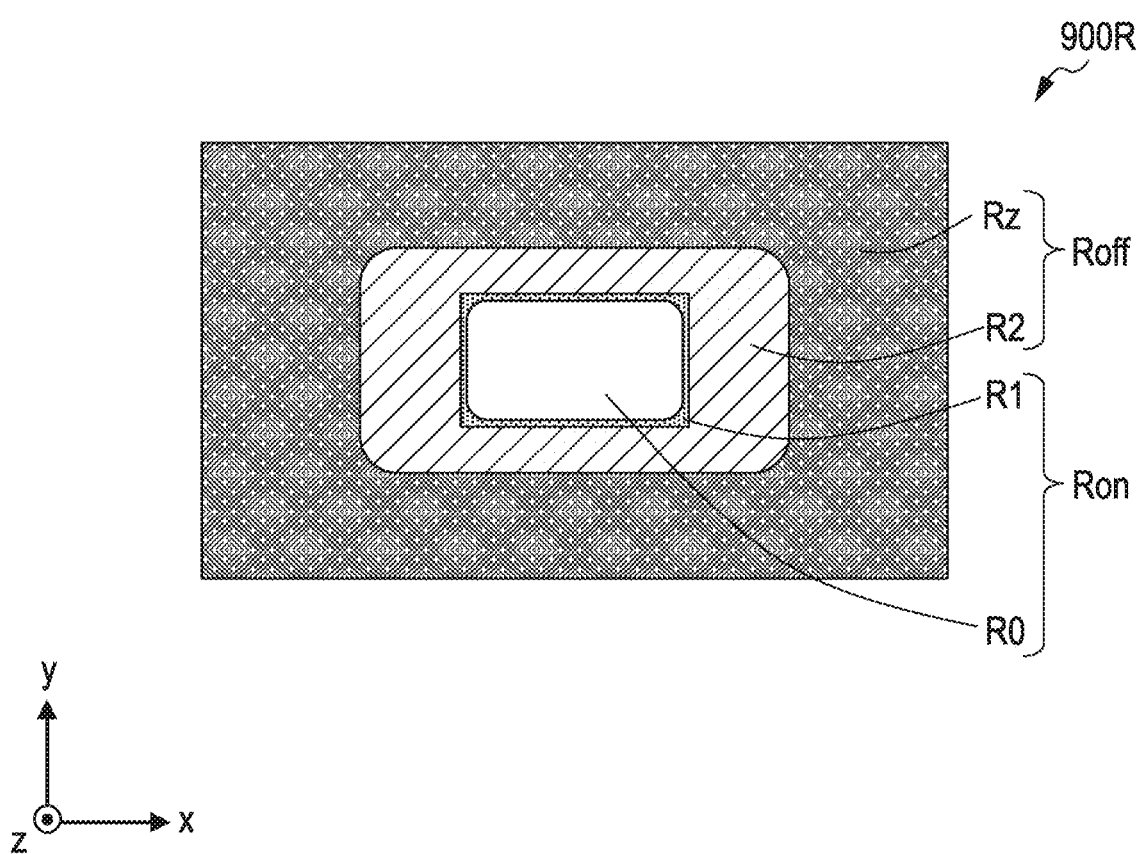
FIG. 4B is a diagram schematically showing an image pattern that is displayed on a liquid crystal display apparatus having the backlight apparatus of Comparative Example 2.

The effects of the backlight apparatus 50A according to the present embodiment are described in comparison with a backlight apparatus of a comparative example. FIG. 3A is a cross-sectional view schematically showing a liquid crystal display apparatus 900 including a backlight apparatus 950 of Comparative Example 1. FIG. 3B is a schematic cross-sectional view of the backlight apparatus 950 of Comparative Example 1 being used to perform partial driving. FIG. 4A is a schematic cross-sectional view of a backlight apparatus 950R of Comparative Example 2 being used to perform partial driving. FIG. 4B is a schematic diagram of a liquid crystal display panel of a liquid crystal display apparatus 900R including the backlight apparatus 950R of Comparative Example 2 as seen in a direction normal to the liquid crystal display panel. The backlight apparatus 950 of Comparative Example 1 differs from the backlight apparatus 50A according to the embodiment of the present disclosure in that the backlight apparatus 950 does not include a louver film. The backlight apparatus 950 of Comparative Example 1 and the liquid crystal display apparatus 900 are equivalent to a backlight apparatus described in PTL 1 and a liquid crystal display apparatus including the same. The backlight apparatus 950R of Comparative Example 2 differs from the backlight apparatus 950 of Comparative Example 1 in that backlight apparatus 950R does not include a wavelength-selective reflecting layer 28.

First, the workings and effects of the wavelength-selective reflecting layer 28 are described with reference to FIGS. 4A and 4B.

As shown in FIGS. 4A and 4B, during partial driving, the backlight apparatus 950R of Comparative Example 2 has an ON region Ron in which light-emitting elements 22 are on and an OFF region Roff in which light-emitting elements 22 are off. FIG. 4B schematically shows an image pattern that is displayed on a liquid crystal display apparatus 900R including the backlight apparatus 950R of Comparative Example 2. A region at the edge of the ON region Ron (i.e. a region in the ON region Ron that is close to a boundary with the OFF region Roff) is shown as a region R1, and a region in the OFF region Roff that surrounds the ON region Ron is shown as a region R2. FIG. 4A schematically shows, together with a schematic cross-sectional view (bottom section) of the backlight apparatus 950R of Comparative Example 2, colors that are displayed in each region (upper section) and the luminances of blue light $L_B$, green light $L_G$, and red light $L_R$ (middle section). The upper section of FIG. 4A schematically shows, with reference to a region (region R0) of the ON region Ron excluding the region R1, the extent to which the colors that are displayed in each region tune blue or yellow. The middle section of FIG. 4A schematically shows the luminances of blue light $L_B$, green light $L_G$, and red light $L_R$ in each region with the magnitude of arrows with the luminance of blue light $L_B$ in the region R0 being a reference (100%). The same applies to diagrams (schematic cross-sectional views during partial driving) that are similar to FIG. 4A.

Using the backlight apparatus 950R of Comparative Example 2 to perform partial driving may cause color unevenness (also called "color halo") to appear. Specifically, as shown in FIG. 4B, the region R2 in the OFF region Roff that surrounds the ON region Ron may have a strong tinge of yellow, although the OFF region Roff is supposed to be a dark section. Furthermore, the region R1 at the edge of the ON region Ron may appear dark bluish. A possible reason for the former phenomenon is that of the light emitted by the phosphor layer 24 in the ON region Ron, light L2 emitted backward (toward the LED substrate 21) may fall on the OFF region Roff by being reflected off the principal surface 21s of the LED substrate 21. The light L2 contains more of light of a red to green wavelength region than blue light. Accordingly, the region R2 appears more yellowish than does the region R0 of the ON region Ron excluding the region R1. The latter color unevenness occurs for the following reason. In the region R1, excitation light L1 (blue light here) falling on the phosphor layer 24 at an angle (in an oblique direction) to a direction normal to a principal surface of the phosphor layer 24 is less than in the region R0 of the ON region Ron excluding the region R1, as the region R1 is adjacent to the OFF region Roff. Accordingly, in the region R1, the luminances of green light that the green phosphor emits upon receiving blue light and red light that the red phosphor emits upon receiving blue light are lower than in the region R0. Therefore, such color unevenness occurs that the region R1 appears more bluish and darker than does the region R0.

On the other hand, the backlight apparatus 950 of Comparative Example 1 shown in FIG. 3A includes a wavelength-selective reflecting layer 28 between the phosphor layer 24 and the LED substrate 21. The wavelength-selective reflecting layer 28 is configured such that the transmittance of the wavelength-selective reflecting layer 28 to the fluorescence emitted by the phosphor layer 24 and falling on the wavelength-selective reflecting layer 28 at the second angle of incidence is lower than the transmittance of the wavelength-selective reflecting layer 28 to the excitation light emitted by the plurality of light-emitting elements 22 and falling on the wavelength-selective reflecting layer 28 at the second angle of incidence; therefore, fluorescence emitted backward (toward the LED substrate 21) by the phosphor layer 24 is inhibited from reaching the principal surface 21s of the LED substrate 21. Accordingly, light produced when the fluorescence emitted backward (toward the LED substrate 21) by the phosphor layer 24 is reflected off the principal surface 21s of the LED substrate 21 can be inhibited from falling on the phosphor layer 24 in the OFF region Roff. The backlight apparatus 950 of Comparative Example 1 can suppress color unevenness during partial driving (in particular, color unevenness in which the region R2 appears yellowish) by including the wavelength-selective reflecting layer 28.

However, according to the inventors' study, even the backlight apparatus 950 of Comparative Example 1 may not be sufficient to suppress color unevenness during partial driving. The wavelength-selective reflecting layer 28 has a lower transmittance to the excitation light falling on the wavelength-selective reflecting layer 28 at the third angle of incidence than to the fluorescence falling on the wavelength-selective reflecting layer 28 at the third angle of incidence. For example, light of a red wavelength region may increase in transmittance when it falls on the wavelength-selective reflecting layer 28 at a larger angle of incidence. Accordingly, of the fluorescence emitted by the phosphor layer 24 in the ON region Ron, light L3 emitted backward (toward the LED substrate 21) and falling on the wavelength-selective reflecting layer 28 at an angle of incidence larger than or equal to a predetermined angle passes through the wavelength-selective reflecting layer 28 and falls on the OFF region Roff by being reflected off the principal surface 21s of the LED substrate 21. The light L3 contains more of light of a red wavelength region. Accordingly, as described with reference to FIG. 4B, color unevenness in which the region R2 in the OFF region Roff that surrounds the ON region Ron appears yellowish is not sufficiently suppressed.

On the other hand, by including the louver film 42, the backlight apparatus 50A according to the present embodiment can suppress color unevenness during partial driving that otherwise would occur in the backlight apparatus 950 of Comparative Example 1 (in particular, color unevenness in which the region R2 appears yellowish). In the backlight apparatus 50A, of the fluorescence emitted by the phosphor layer 24 in the ON region Ron, light L3 falling on the wavelength-selective reflecting layer 28 at an angle of incidence larger than or equal to a predetermined angle, passing through the wavelength-selective reflecting layer 28, and reflected off the principal surface 21s of the LED substrate 21 is blocked by the plurality of louvers 421, so that the light L3 is inhibited from falling on the OFF region Roff. The backlight apparatus 50A can reduce degradation in the display quality of a liquid crystal display apparatus.

Another example of a louver film that a backlight apparatus according to the present embodiment may include is described. As in the case of a louver film 43 shown in FIG. 1E, louvers 431 extending in a first direction (in the drawing, the y direction) may be placed parallel to each other, for example, when seen in the direction normal to the principal surface 21s of the LED substrate 21. That is, a plurality of the louvers 431 are formed in stripes when seen in the direction normal to the principal surface 21s of the LED substrate 21. In the example shown in FIG. 1E, the plurality of louvers 431 are regularly arrayed (pitch P2 between adjacent louvers 431). As with the aforementioned louver film 42, the louver film 43 blocks at least part of the fluorescence emitted by the phosphor layer 24 and the excitation light emitted by the light-emitting elements 22. The louver film 43 further includes two opposed base films, and the plurality of louvers 431 are disposed between the two base films.

Figure 1E:
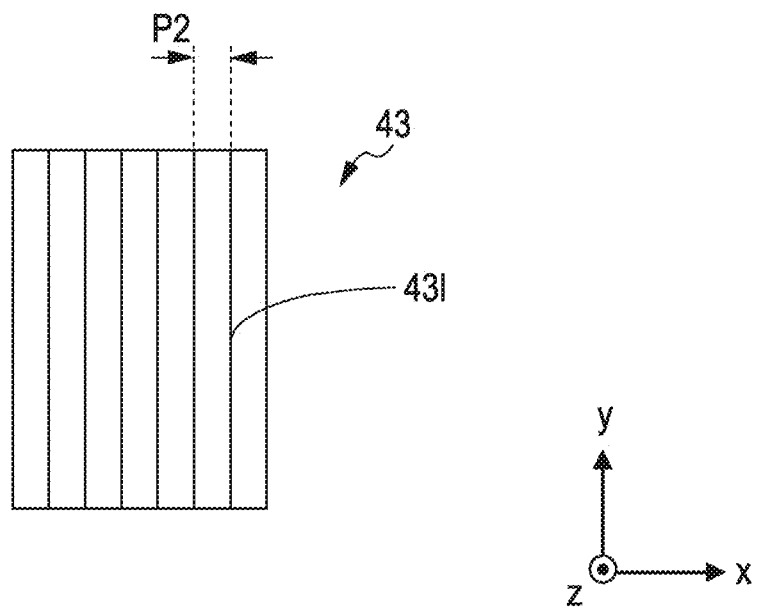
FIG. 1E is another example of a schematic plan view of a louver film of another backlight apparatus of Embodiment 1.
Figure 1F:
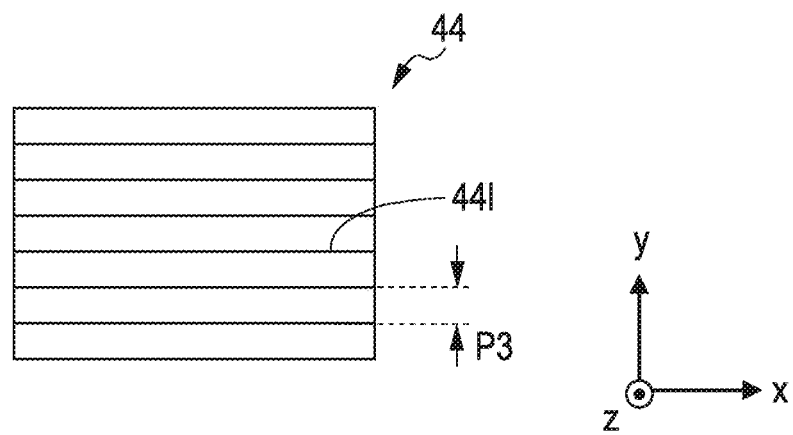
FIG. 1F is an example of a schematic plan view of still another louver film of another backlight apparatus of Embodiment 1.

The backlight apparatus according to the present embodiment may include, in addition to the louver film 43 shown in FIG. 1E, another louver film 44 (FIG. 1F) having a plurality of louvers 441 extending in a second direction (e.g. in the drawing, an x direction) that is different from the first direction. The louver film 44 too blocks at least part of the fluorescence emitted by the phosphor layer 24 and the excitation light emitted by the light-emitting elements 22. The louver film 44 further includes two opposed base films, and the plurality of louvers 441 are disposed between the two base films. The louver film 44 may be placed such that the plurality of louvers 431 of the louver film 43 and the plurality of louvers 441 of the louver film 44 are substantially orthogonal to each other, for example, when seen in the direction normal to the principal surface 21s of the LED substrate 21. For example, the pitch P2 between adjacent louvers 431 and a pitch P3 between adjacent louvers 441 may be equal to each other. Alternatively, the louver film 43 and the louver film 44 may be replaced by a single louver film having a plurality of louvers formed in a reticular pattern so as to be orthogonal to each other. Note, however, that in the backlight apparatus according to the present embodiment, it is preferable that each of the plurality of louvers be disposed so as not to overlap each of the plurality of light-emitting elements 22 when seen in a direction normal to the principal surface 21s of the LED substrate 21.

Figure 1G:
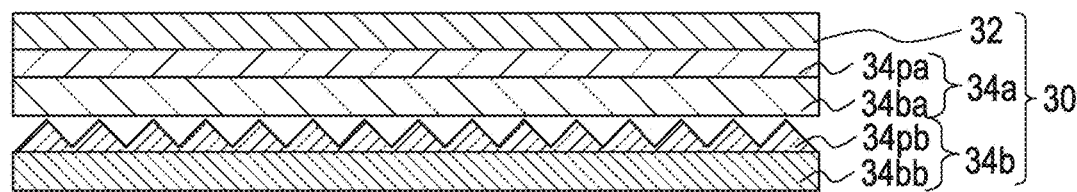
FIG. 1G is an example of a schematic cross-sectional view of an optical layer stack of the backlight apparatus.

The backlight apparatus 50A may further include an optical layer stack 30 disposed at a side of the phosphor layer 24 that faces away from the wavelength-selective reflecting layer 28. For example, as shown in FIG. 1G, the optical layer stack 30 has two prism sheets 34a and 34b disposed so that their prism ridge lines are substantially orthogonal to each other and a polarization selection reflecting layer 32 disposed over the two prism sheets 34a and 34b. The prism sheet 34a has, for example, a base film 34ba and a prism layer 34pa formed over the base film 34ba, and the prism sheet 34b has, for example, a base film 34bb and a prism layer 34pb formed over the base film 34bb. Usable examples of the prism sheets 34a and 34b are BEF manufactured by 3M. The polarization selection reflecting layer 32 is for example an optical multilayer film having a stack structure in which films of different refractive indices are stacked. A usable example of the polarization selection reflecting layer 32 is DBEF (registered trademark) manufactured by 3M. The stack structure of the optical layer stack 30 is not limited to the illustrated example but may be changed as appropriate.

Figure 1H:
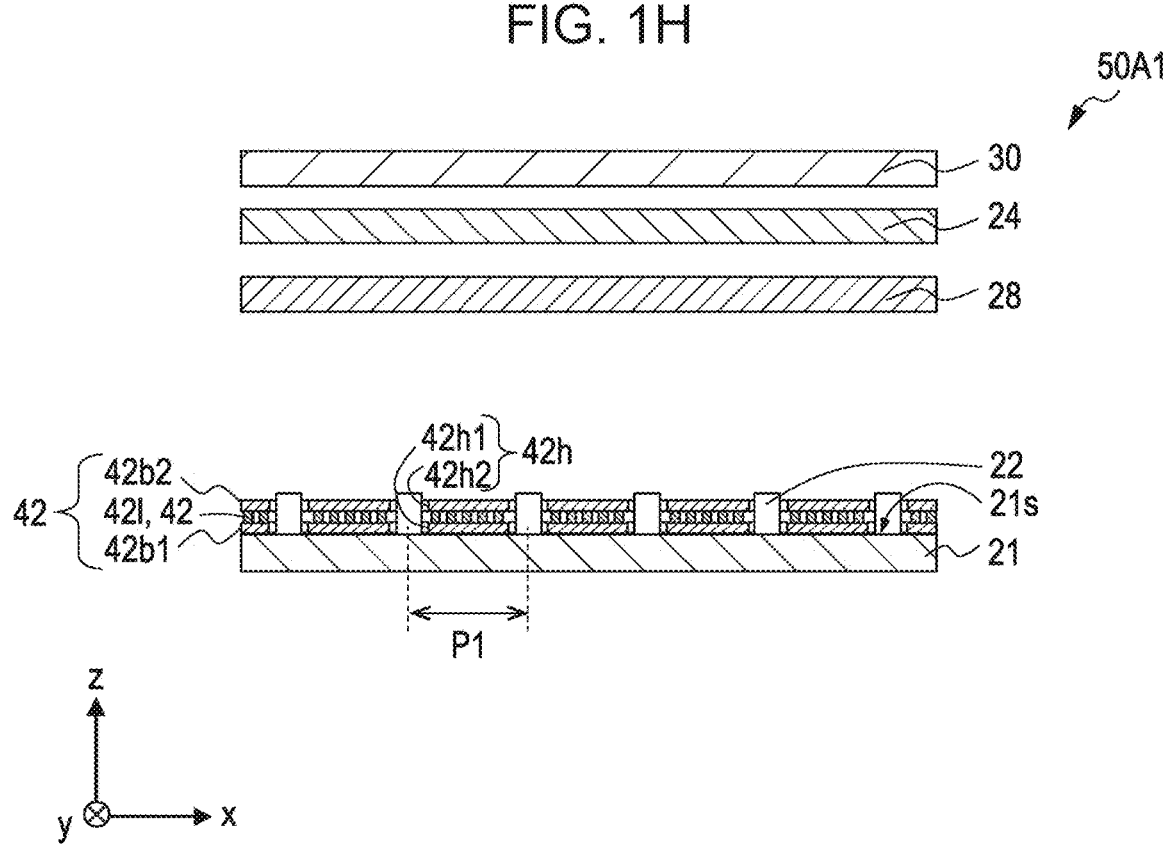
FIG. 1H is a cross-sectional view schematically showing a backlight apparatus according to a modification of Embodiment 1.

FIG. 1H shows a backlight apparatus according to a modification of the present embodiment. The backlight apparatus 50A1 shown in FIG. 1H differs from the backlight apparatus 50A in that the backlight apparatus 50A1 does not include a diffuser 48. As with the backlight apparatus 50A, the backlight apparatus 50A1 too can reduce degradation in the display quality of a liquid crystal display apparatus.

Embodiment 2

Figure 2A:
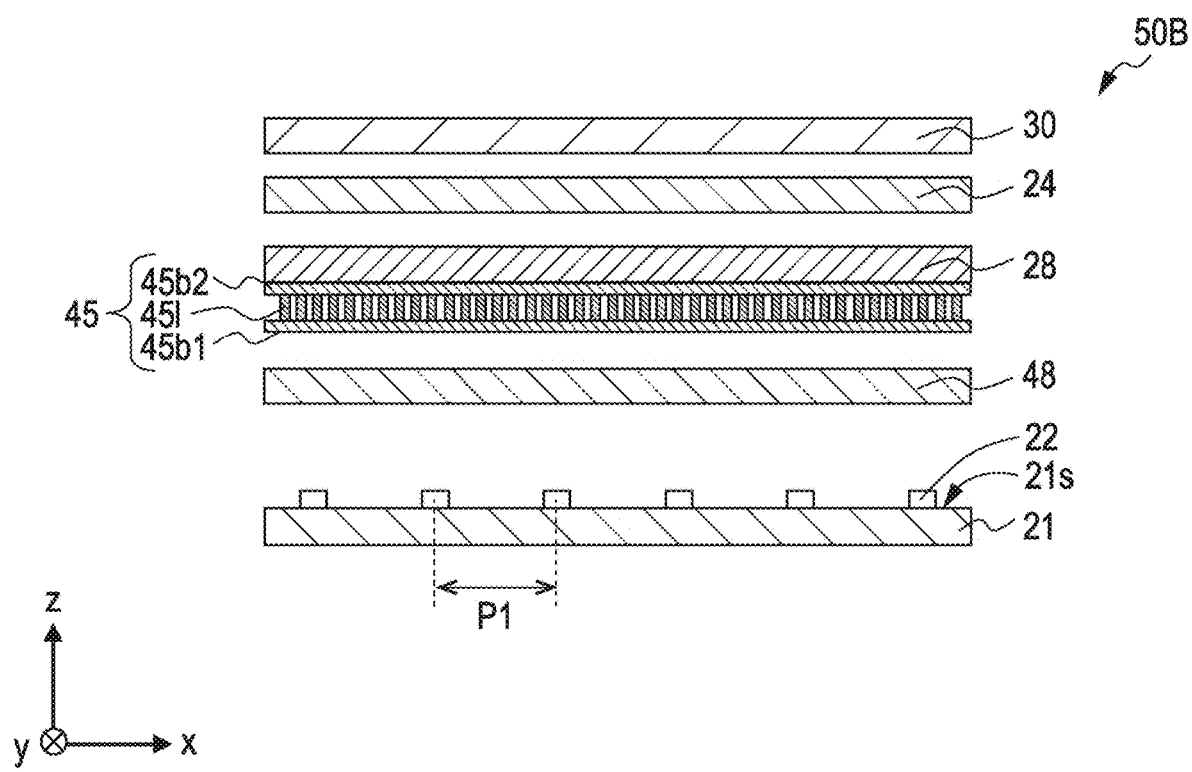
FIG. 2A is a cross-sectional view schematically showing a backlight apparatus according to Embodiment 2.

A backlight apparatus according to the present embodiment is described with reference to FIGS. 2A, 2B, and 2C. FIG. 2A is a cross-sectional view schematically showing a backlight apparatus 50B according to Embodiment 2, and FIG. 2B is a schematic cross-sectional view of the backlight apparatus 50B being used to perform partial driving. FIG. 2C is a plan view of the backlight apparatus 50B and is a diagram schematically showing an example of a positional relationship between a plurality of louvers 451 and light-emitting elements 22.

The backlight apparatus 50B differs from the backlight apparatus 50A in that a louver film 45 is disposed in a position closer to the wavelength-selective reflecting layer 28 than to the LED substrate 21 (in a case where a diffuser 48 is provided, disposed between the wavelength-selective reflecting layer 28 and the diffuser 48). The louver film 45 is supported, for example, by the diffuser 48. The louver film 45 is provided, for example, over a principal surface of the wavelength-selective reflecting layer 28 that faces the LED substrate 21. The louver film 45 includes two opposed base films 45b1 and 45b2 and a plurality of louvers 451 disposed between the two base films 45b1 and 45b2. The base film 45b2, which is closer to the wavelength-selective reflecting layer 28 than is the base film 45b1, may be bonded, for example, via an adhesive layer to the principal surface of the wavelength-selective reflecting layer 28 that faces the LED substrate 21. The backlight apparatus 50B further includes a diffuser 48 disposed between the LED substrate 21 and the louver film 45. Note that the diffuser 48 may be omitted. For simplicity, FIG. 2B omits to illustrate the diffuser 48.

As in the case of the backlight apparatus 50A, using the backlight apparatus 50B too makes it possible to reduce degradation in the display quality of a liquid crystal display apparatus. As in the case of the backlight apparatus 50A, using the backlight apparatus 50B too makes it possible to suppress color unevenness in which the region R2 that surrounds the ON region Rn appears yellowish during partial driving. In the backlight apparatus 50B, of the fluorescence emitted by the phosphor layer 24 in the ON region Ron, light L3 falling on the wavelength-selective reflecting layer 28 at an angle of incidence larger than or equal to a predetermined angle and passing through the wavelength-selective reflecting layer 28 is blocked by the plurality of louvers 451, so that the light L3 is inhibited from falling on the OFF region Roff.

Furthermore, the backlight apparatus 50B can reduce the occurrence of color unevenness during partial driving more effectively than can the backlight apparatus 50A. The backlight apparatus 50B can suppress the color unevenness, described with reference to FIGS. 4A and 4B, in which the region R1 at the edge of the ON region Ron appears dark bluish. In the backlight apparatus 50B, the louver film 45 is disposed in a position closer to the wavelength-selective reflecting layer 28 than to the LED substrate 21 (for example, the louver film 45 is provided over the principal surface of the wavelength-selective reflecting layer 28 that faces the LED substrate 21), so that excitation light L1 falling on the phosphor layer 24 at an angle (in an oblique direction) to a direction normal to a principal surface of the phosphor layer 24 is blocked by the louver film 45. Accordingly, the difference between excitation light falling on the phosphor layer 24 in the region R1 and excitation light falling on the phosphor layer 24 in the region R0 of the ON region Ron excluding the region R1 is small. Accordingly, the color unevenness in which the region R1 appears dark bluish can be suppressed.

As shown in FIG. 2C, the louvers 451 of the louver film 45 extend in the y direction in the drawing and are placed parallel to each other when seen in the direction normal to the principal surface 21s of the LED substrate 21. That is, the plurality of louvers 451 are formed in stripes when seen in the direction normal to the principal surface 21s of the LED substrate 21. The plurality of louvers 451 are regularly arrayed, and a pitch between a plurality of louvers 451 is smaller than a pitch P1 between a plurality of light-emitting elements 22. The plurality of louvers 451 includes a louver 451 disposed to overlap any of the plurality of light-emitting elements 22 when seen in the direction normal to the principal surface 21s of the LED substrate 21.

Embodiments of the present disclosure provide solutions described in the following items.

Item 1

A backlight apparatus including:
an LED substrate having a principal surface over which a plurality of light-emitting elements that emit excitation light are arrayed;
a phosphor layer containing a phosphor that emits fluorescence upon receiving the excitation light;
a wavelength-selective reflecting layer disposed between the phosphor layer and the LED substrate, the wavelength-selective reflecting layer having different transmittances according to wavelengths and/or angles of incidence of light falling thereon; and
a louver film disposed between the wavelength-selective reflecting layer and the LED substrate and having a plurality of louvers, the louver film blocking the fluorescence and the excitation light falling thereon at an angle greater than or equal to a first angle and smaller than 90 degrees with respect to a direction normal to a film surface of the louver film.

Item 2

The backlight apparatus according to Item 1, wherein the louver film is supported by the LED substrate.

Item 3

The backlight apparatus according to Item 2, wherein the louver film is provided over the principal surface of the LED substrate.

Item 4

The backlight apparatus according to Item 2 or 3, wherein the louver film has a plurality of openings that overlap the plurality of light-emitting elements when seen in a direction normal to the principal surface of the LED substrate.

Item 5

The backlight apparatus according to any one of Items 2 to 4, wherein each of the plurality of louvers is disposed in such a position as not to overlap each of the plurality of light-emitting elements when seen in a direction normal to the principal surface of the LED substrate.

Item 6

The backlight apparatus according to any one of Items 2 to 5, further including a diffuser disposed between the louver film and the wavelength-selective reflecting layer.

Item 7

The backlight apparatus according to Item 1, wherein the louver film is provided over a principal surface of the wavelength-selective reflecting layer that faces the LED substrate.

Item 8

The backlight apparatus according to Item 7, further including a diffuser disposed between the louver film and the LED substrate.

Item 9

The backlight apparatus according to any one of Items 1 to 8, wherein the wavelength-selective reflecting layer has a higher transmittance to the excitation light falling thereon at a second angle of incidence than to the fluorescence falling thereon at the second angle of incidence and has a lower transmittance to the excitation light falling thereon at a third angle of incidence that is larger than the second angle of incidence than to the fluorescence falling thereon at the third angle of incidence.

Item 10

The backlight apparatus according to Item 9, wherein
the second angle includes an angle larger than or equal to 0 degree and smaller than 40 degrees, and
the third angle includes an angle larger than or equal to 70 degrees and smaller than 90 degrees.

Item 11

The backlight apparatus according to any one of Items 1 to 10, wherein the first angle is larger than or equal to 15 degrees.

Item 12

The backlight apparatus according to any one of Items 1 to 11, further including an optical layer stack disposed at a side of the phosphor layer that faces away from the wavelength-selective reflecting layer.

Item 13

The backlight apparatus according to Item 12, wherein the optical layer stack has two prism sheets disposed so that their prism ridge lines are substantially orthogonal to each other and a polarization selection reflecting layer disposed over the two prism sheets.

Item 14

The backlight apparatus according to any one of Items 1 to 13, wherein the phosphor includes a quantum dot phosphor.

Item 15

A liquid crystal display apparatus including:
a liquid crystal display panel; and
the backlight apparatus according to any one of Items 1 to 14, the backlight apparatus emitting light toward a back surface of the liquid crystal display panel.

Using a backlight apparatus of the embodiments of the present disclosure makes it possible to reduce degradation in the display quality of a liquid crystal display apparatus.

The present disclosure contains subject matter related to that disclosed in U.S. Provisional Patent Application No. 63/471,947 filed in the United States Patent Office on Jun. 8, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight apparatus comprising:
a light-emitting diode (LED) substrate having a principal surface over which a plurality of light-emitting elements that emits excitation light is arrayed;
a phosphor layer containing a phosphor that emits fluorescence upon receiving the excitation light;
a wavelength-selective reflecting layer disposed between the phosphor layer and the LED substrate, the wavelength-selective reflecting layer having different transmittances according to wavelengths and/or angles of incidence of light falling thereon; and
a louver film disposed between the wavelength-selective reflecting layer and the LED substrate and having a plurality of louvers, the louver film blocking the fluorescence and the excitation light falling thereon at an angle greater than or equal to a first angle and smaller than 90 degrees with respect to a direction normal to a film surface of the louver film, wherein
the louver film is supported by the LED substrate, and
each of the plurality of louvers is disposed in such a position as not to overlap each of the plurality of light-emitting elements when seen in a direction normal to the principal surface of the LED substrate.

2. The backlight apparatus according to claim 1, wherein the louver film is provided over the principal surface of the LED substrate.

3. The backlight apparatus according to claim 1, wherein the louver film further has a plurality of openings that overlaps the plurality of light-emitting elements when seen in the direction normal to the principal surface of the LED substrate.

4. The backlight apparatus according to claim 1, further comprising a diffuser disposed between the louver film and the wavelength-selective reflecting layer.

5. A backlight apparatus comprising:
a light-emitting diode (LED) substrate having a principal surface over which a plurality of light-emitting elements that emits excitation light is arrayed;
a phosphor layer containing a phosphor that emits fluorescence upon receiving the excitation light;
a wavelength-selective reflecting layer disposed between the phosphor layer and the LED substrate, the wavelength-selective reflecting layer having different transmittances according to wavelengths and/or angles of incidence of light falling thereon;
a louver film disposed between the wavelength-selective reflecting layer and the LED substrate and having a plurality of louvers, the louver film blocking the fluorescence and the excitation light falling thereon at an angle greater than or equal to a first angle and smaller than 90 degrees with respect to a direction normal to a film surface of the louver film; and
a diffuser disposed between the louver film and the LED substrate, wherein
the louver film is provided over a principal surface of the wavelength-selective reflecting layer that faces the LED substrate.

6. A backlight apparatus comprising:
a light-emitting diode (LED) substrate having a principal surface over which a plurality of light-emitting elements that emits excitation light is arrayed;
a phosphor layer containing a phosphor that emits fluorescence upon receiving the excitation light;
a wavelength-selective reflecting layer disposed between the phosphor layer and the LED substrate, the wavelength-selective reflecting layer having different transmittances according to wavelengths and/or angles of incidence of light falling thereon; and
a louver film disposed between the wavelength-selective reflecting layer and the LED substrate and having a plurality of louvers, the louver film blocking the fluorescence and the excitation light falling thereon at an angle greater than or equal to a first angle and smaller than 90 degrees with respect to a direction normal to a film surface of the louver film,
wherein the wavelength-selective reflecting layer has a higher transmittance to the excitation light falling thereon at a second angle of incidence than to the fluorescence falling thereon at the second angle of incidence and has a lower transmittance to the excitation light falling thereon at a third angle of incidence that is larger than the second angle of incidence than to the fluorescence falling thereon at the third angle of incidence.

7. The backlight apparatus according to claim 6, wherein
the second angle includes an angle larger than or equal to 0 degree and smaller than 40 degrees, and
the third angle includes an angle larger than or equal to 70 degrees and smaller than 90 degrees.

8. The backlight apparatus according to claim 6, wherein the first angle is larger than or equal to 15 degrees.

9. The backlight apparatus according to claim 6, further comprising an optical layer stack disposed at a side of the phosphor layer that faces away from the wavelength-selective reflecting layer.

10. The backlight apparatus according to claim 9, wherein the optical layer stack has
two prism sheets disposed such that prism ridge lines of the two prism sheets are substantially orthogonal to each other and
a polarization selection reflecting layer disposed over the two prism sheets.

11. The backlight apparatus according to claim 6, wherein the phosphor includes a quantum dot phosphor.

12. A liquid crystal display apparatus comprising:
a liquid crystal display panel; and
the backlight apparatus according to claim 6, the backlight apparatus emitting light toward a back surface of the liquid crystal display panel.

\* \* \* \* \*